United States Patent Office 3,167,333
Patented Jan. 26, 1965

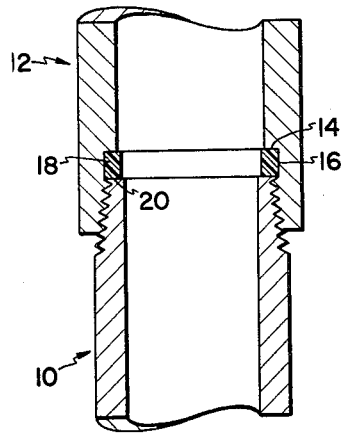
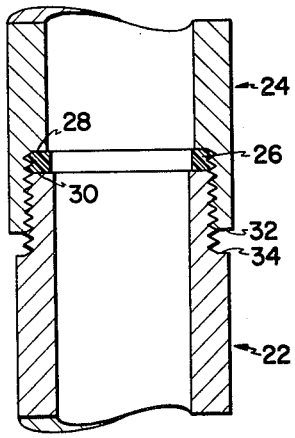
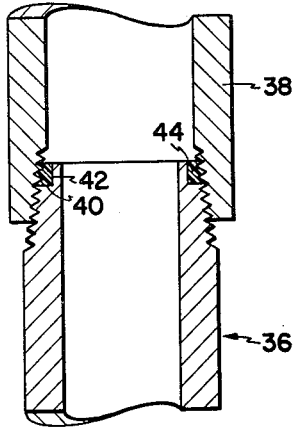
FIG.-1  FIG.-2  FIG.-3
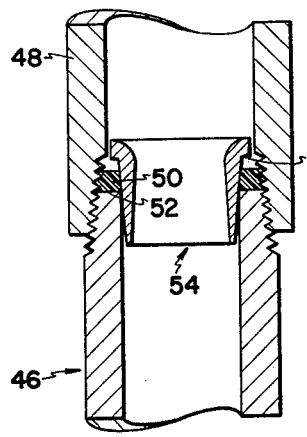
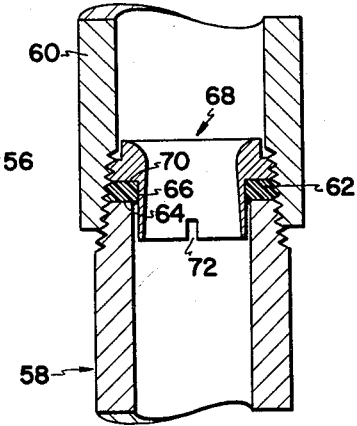
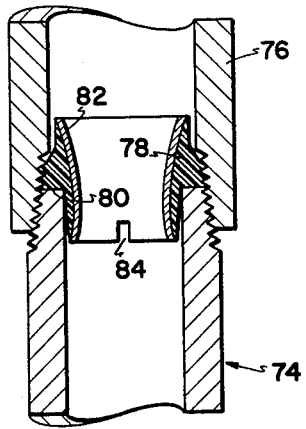
FIG.-4  FIG.-5  FIG.-6

3,167,333
SEALED PIPE JOINT
Alvin C. Hall, Woodbury, and Arendt R. Koos, Clark, N.J., assignors to Richard L. Cannaday, New York, N.Y.
Filed Nov. 13, 1959, Ser. No. 852,644
1 Claim. (Cl. 285—140)

This invention relates to pipe joints. It relates particularly to screwed pipe joints of the kind effected between a pipe or pipe fitting having an external (male) thread and one which has an internal (female) thread, and it relates more particularly to such screwed pipe joints which are made essentially fluid-tight by means of sealing materials disposed within the interior surfaces of the female-threaded joint members.

There are a number of methods and means known to the prior art for rendering screwed pipe joints fluid-tight, some examples of which, and their shortcomings, will be described.

In one known method various sealing compounds, commonly called pipe dopes, such as litharge and glycerine are smeared on the threaded regions of the pipe elements before the latter are screwed together. Another dope sometimes used comprises "Teflon" (a plastic consisting of tetrafluoroethylene polymer and marketed by E. I. du Pont de Nemours and Co.) finely ground and distributed through a carrier medium which may be water and a wetting agent.

Pipe joint seals made with hard-setting dope are deficient in that they tend to develop leaks when the joint members are subjected to transverse or torsional flexing. Dopes may be specially prepared to remain at least semi-soft, but these will be limited in respect of the fluid pressures against which they can seal. Further, whether a dope be prepared to set hard or semi-soft, the question may always arise of compatibility of the dope substance with the fluid material against the pressure of which the dope is intended to seal.

In another known method a piece of adhesive plastic tape is wrapped over the threaded region of the male pipe joint element before the joint is made, and so is forced into the joint when the male and female elements are screwed together.

Pipe joint seals made with adhesive plastic tape are deficient for essentially the same reasons as those which apply in the case of doped joints discussed already. This is because the tape is shredded into particles as the male and female pipe elements are screwed together to make the joint, and thereafter has the form and consequently the behavior of a dope.

In still another known method a nut is run back along the threads of the male pipe joint element before the latter is screwed into the female element. After the male and female elements are joined, a piece of string is wound tightly around the male element as close to the female element as possible, desirably in contact with the outer shoulder of the latter element. The nut is then run in on the male element toward the female element to bear heavily on the string winding, and jam in this string as a packing at the outer thread interface of the male and female joint members. In an alternate form of this method the regular (solid) nut and string may be replaced with a hollowed-out nut containing a plastic ring insert such as Teflon. This insert, like the string, will be compressed into the outer thread interface of the male and female joint joint members to make an initial seal.

Pipe joint seals made with a string winding or plastic ring compressed against the female element by a nut on the male element are deficient in several ways. In the first place, running the nut against the female element to compress the sealing material puts a tensile load on the male member. This load will come at the root of the male threads, the worst possible place for stress concentrations. The more the nut is tightened against the female element for sealing purposes, the more the tensile stress condition will be aggravated, and thus increased effectiveness of the seal means decreased soundness of the joint with regard to its mechanical strength. In the second place, fluid under pressure seeping through the engaged region of the male and female threads and coming in contact with the string winding or plastic ring will tend to displace this material away from the thread interface of the pipe joint members and to destroy or at least reduce the effectiveness of the seal. In the third place, should the male and female pipe joint elements be improperly screwed together, that is, cross threaded, a seal may still be obtained by running the nut in hard against the female element to compress the string winding or plastic ring. Obtaining of this seal will at least tend to obscure a condition of initial mechanical unsoundness of the joint, as well as aggravating such unsoundness by tensile stressing described already.

In even still another known method an O-ring of compressible, usually resilient material is used for sealing. This requires a collar on the male pipe joint element beyond the threads thereof. In one application, this collar will be grooved to receive the O-ring and there will have to be a finished surface on the exterior of the female member, generally parallel with the flat face of the collar, whereagainst the O-ring may be compressed. In another application, the female joint member is specially and smoothly countersunk, and a smooth region is provided on the surface of the male element intermediate the end of the threads thereon and the collar. The O-ring is fitted onto this smooth region, and when the male and female joint member are screwed together the O-ring is compressed against the countersunk surface of the female element.

Pipe joint seals made with an O-ring compressed between a collar on the male pipe joint element and a smoothly finished surface on the female element are deficient in at least two ways. In the first place, all pipe parts are either specially shaped or specially finished or both. In the second place, running the male element into the female element until the collar on the former bears against an exterior surface on the latter will cause tensile stressing at the root of the threads on the male element. Thus, just as in the case of the separate nut on the male element described already, the more the collar on the male pipe joint member is tightened against the female element to compress the O-ring and increase its effectiveness in sealing against fluids, the more the male threads will be stressed in tension and mechanical soundness of the joint impaired.

According to the present invention, a screwed pipe joint sealed essentially fluid-tight is provided which is significantly different from and improved over any of those just described. The basic principle of this invention consists essentially of placing a suitable sealing material such as Teflon, rubber, neoprene (polymerized chloroprene), soft metal, etc., at the end of the male pipe joint element and tightening on this material in such a manner that it makes a two-way seal, one way against the interior surface of the female pipe joint element and the other way against the end of the male element. With this arrangement, the great advantage obtains that both the pressure forces of the fluid being contained in or conveyed through the pipe elements and any tendency of the material to yield steadily plastically or creep (in the case of a metal) act to maintain the seal and prevent leakage. Such cooperative action is not characteristic of at least the first three of the above-described pipe joint seals of the prior art.

Other significant advantages of the present invention are that it provides a screwed pipe joint which is tightly sealed without any external forces applied to the male pipe joint element tending to set up tensile stresses in the threads thereof, and that it provides such a sealed joint with a minimum number of special pipe parts. All of these advantages are achieved without the use of any welding, brazing, or other metals-joining technique tending to form an essentially permanent union of the male and female pipe joint elements.

The nature and substance of this invention may be more clearly perceived and fully understood by referring to the following description and claim taken in connection with the accompanying drawing in which:

FIG. 1 represents a view in longitudinal section through a screwed pipe joint on tapered threads according to this invention wherein the female element is internally shouldered to accommodate the sealing material;

FIG. 2 represents a view in longitudinal section through a screwed pipe joint on straight threads according to this invention wherein the female element is internally shouldered to accommodate the sealing material;

FIG. 3 represents a view in longitudinal section through a screwed pipe joint on tapered threads according to this invention wherein the male element is externally shouldered to accommodate the sealing material;

FIG. 4 represents a view in longitudinal section through a screwed pipe joint on tapered threads according to this invention wherein the sealing material is located and retained in part by a support piece fitted into the bore of the male element;

FIG. 5 represents a view in longitudinal section through a screwed pipe joint on tapered threads according to this invention wherein the sealing material is located and reained in part by a support piece screwed into the threads of the female element, and FIG. 6 represents a view in longitudinal section through a screwed pipe joint on tapered threads according to this invention wherein the sealing material is primarily located and retained by itself being screwed into the threads of the female element.

Referring now to the drawing, particularly FIG. 1 thereof, the male element of the pipe joint is designated 10 and the female element is designated 12. It will be noted that the joint elements 10 and 12 are cut with tapered threads; that is, the pipe joint illustrated is one where the word "pipe" is used in its specialized sense meaning a joint where the male and female elements are screwed together on a taper. At least some threads have been cut out at the inner end of the threaded region in female element 12 to provide an internal shoulder 14 and circumferential surface 16 whereagainst and wherewithin a ring of sealing material 18 is located, assuming this shoulder and circumferential surface not to have existed in the female element as the latter was first fabricated.

For purpose of the present invention, the sealing material of ring 18 may be any relatively easily deformable material which will yield plastically to conform to rough and relatively harder bounding surfaces. Some materials suitable for sealing purposes according to this invention will exhibit the tendency to cold flow or creep; that is, they will tend to yield or flow plastically into and through any adjacent apertures in their boundaries under the influence of a continuing external force. As pointed out earlier, suitable sealing materials include Teflon, rubber, neoprene, and soft metals such as soft copper and soft lead. These particular materials are, of course, cited only by way of example and not of limitation. In any given case the sealing material will, it is understood, be chosen to be substantially unaffected chemically by and itself have no reactive effect upon whatever fluid is to flow through pipe joint elements 10 and 12.

In assembling the joint of FIG. 1, assuming the internal shoulder 14 to be present in female element 12, the sealing ring 18 is set in place in the female element and the male element 10 is run in on its threads to compress the sealing ring between the penetrating end 20 of the male element and the shoulder 14. The threads of the male and female elements must not seize before a seal has been made against each of these elements by the ring 18, and the ring is at least just about to be deformed or flowed into the mating line of the threads on the joint elements 10 and 12. Most desirably, these threads will go tight just as this flow begins.

After the threads are tight with the initial seals made, pressure of fluid material contained in or conveyed through the pipe elements may be exerted against the internal circumferential face of sealing ring 18. Under the influence of this pressure the sealing material will more and more tend to be flowed into the mating threads to maintain the seal, as well as continued in compression longitudinally against the end of male element 10 and the internal shoulder of female element 12.

Referring next to FIG. 2, a screwed pipe joint and sealing means therefor are illustrated which are generally similar to those shown in FIG. 1, but with the particular difference that the male element 22 and the female element 24 are cut with straight instead of tapered threads. In this case, it will be desirable that the sealing ring 26 be formed initially with threads in its outer circumferential face so that it may be screwed down against shoulder 28 in female element 24 rather than be an initially rather loose fit in this element or else have to be forced over the threads thereof.

Seals will be made against shoulder 28 and penetrating end 30 of the male element as elements 22 and 24 are screwed together, and flow of sealing material into the thread interface will be imminent. These seals must be made, and desirably the flow of sealing material will be started before the male element is run into the female element to the point that there is contact between external shoulders 32 and 34 of these elements.

Referring next to FIG. 3, the male element of the pipe joint is designated 36 and the female element 38, and it will be noted that these elements are cut with tapered threads. At least some threads have been cut back at the outer end of the threaded region on male element 36 to provide an external shoulder 40 and circumferential surface 42 whereagainst and whereround a ring of sealing material 44 is located, assuming this shoulder and surface not to have existed on the male element as the latter was first fabricated. In this embodiment of the present invention, ring 44 should not only be located against shoulder 40 and surface 42 of pipe element 36 as shown, but should also be substantially fixedly secured to this pipe element initially for purposes of assembly of the joint.

Such securing may be effected by any suitable means including a cement on shoulder 40 and circumferential surface 42, or knurling on this latter surface with sealing ring 44 being a press fit thereover. It is desired to point out and particularly emphasize, however, that no such cementing, knurling, press fitting, or combination of these techniques mentioned here or elsewhere in this specification is contemplated as having any significance in and of itself for making a seal according to the present invention. Its only significance lies in facilitating the assembly of pipe joint parts. Considering the apparatus embodiment of the present invention shown in FIG. 3, the sealing ring will desirably be threaded externally in continuation of the threads on male pipe joint element 36.

In assembling the joint of FIG. 3, assuming the external shoulder to be present on male element 36, the sealing ring 44 is secured in place on the male element, and this element with sealing ring attached is run in on its threads to compress the sealing ring between shoulder 40 and circumferential surface 42 of the male element on the one hand and the threads of female element 38 on the other. When a substantial degree of tightness between the threads of the male and female elements is achieved, sealing ring 44 should be sufficiently highly compressed to be at least about to flow back slightly into the thread interface of pipe elements 36 and 38.

After the threads are tight with the initial seals made against the female threads and surfaces 40 and 42 on male element 36, pressure of fluid material contained in or conveyed through the pipe elements may be exerted against the exposed surface of sealing ring 44. Under the influence of this pressure the sealing material will more and more tend to be flowed into the mating threads to maintain the seal, as well as continued in compression against the female threads and shoulder 40 and circumferential surface 42 on the male pipe element.

Referring next to FIG. 4, the male element of the pipe joint is designated 46 and the female element 48, and it will be noted that these elements are cut with tapered threads. A ring of sealing material 50 is seated on the penetrating end surface 52 of male element 46, and on its outer circumferential surface, preferably threaded before assembly of the joint to serve in extension of the male pipe threads, this ring is in contact with the threaded region of female element 48. On its inner circumferential surface, sealing ring 50 encloses and bears upon hollow support piece 54 inserted into male pipe element 46. This support piece is at least slightly tapered on its outer surface to provide a tight wedge fit in the bore of the male element. It will preferably be given a venturi shape on its inner surface to minimize pressure losses of fluids flowing through it between pipe joint elements 46 and 48. Support piece 54 may also be provided with an external shoulder surface 56 to prevent overdriving into the bore of pipe element 46. An advantageous feature of the pipe joint of FIG. 4 in comparison with those of FIGS. 1, 2, and 3, however, is that no specially provided shoulder is needed on either the male or female pipe joint element to seat the sealing material. With a sealing ring 50 and support piece 54 of proper size available, therefore, the joint of FIG. 4 can be made of standard pipe parts.

In one mode of assembling the joint of FIG. 4, sealing ring 50 is first located on pipe end surface 52 and then support piece 54 is inserted through the ring and driven into the bore of male element 46. In another mode of assembling the joint, the sealing ring is slid part way onto the support piece and then the support piece is driven into the bore of male element 46 with pipe end surface 52 acting as a stop for sealing ring 50 and forcing it farther along support piece 54. Whichever mode is used, the conditions desired to be achieved are the sealing ring seated on the end of the male pipe element and at least slightly expanded by the support piece, and the support piece wedged tightly in the bore of pipe element 46. Travel of the support piece in the pipe bore should be stopped by this wedging action before shoulder 56 comes in contact with sealing ring 50.

After making the sub-assembly of male pipe joint element 46, sealing ring 50, and support piece 54, assembly of the joint of FIG. 4 is completed by screwing pipe elements 46 and 48 together until their threads are firmly seized. The tapered threads of female element 48 will compress the sealing ring, and force it more firmly against the outer surface of support piece 54 and end surface 52 of male pipe element 46. Effective seals will be made against the female threads and male pipe end surface 52. Plastic flow of the sealing material into the mating line of the pipe element threads will be at least incipient.

In any event, as the sealing ring is compressed against support piece 54 and the end of pipe element 46 it will tend to expand longitudinally in female pipe element 48. At least some clearance between the sealing ring and support piece shoulder 56 in the above-described sub-assembly of pipe element 46, ring 50, and support piece 54 is needed, therefore, to allow this longitudinal expansion of the sealing material without setting up a force between this material and the support piece which would tend to push the support piece off its seat in the bore of the male pipe element.

The enlarged end of support piece 54 is neither counted upon nor desired to be a particularly close fit in the bore of female pipe joint element 48. Accordingly, pressure of fluid material contained in or conveyed through the pipe elements will be exerted directly against a surface of sealing ring 50. Under the influence of this pressure the sealing material will more and more tend to be flowed into the mating threads to maintain the seal, as well as continued in compression against the female threads and the male pipe end surface 52. Flow through the joint of FIG. 4 will be, in general, preferably from female element 48 into male element 46 so that any net fluid force exerted on support piece 54 in the direction of flow will tend to maintain the support piece seated in the male pipe element. If the support piece be driven quite firmly into male element 46 initially, however, this preference may well be negligible.

Referring next to FIG. 5, the male element of the pipe joint is designated 58 and the female element 60, and it will be noted that these elements are cut with tapered threads. A ring of sealing material 62 is seated on the penetrating end surface 64 of male element 58, and on its own outer circumferential surface this ring is in contact with the threaded region of female element 60. On its inner circumferential surface, sealing ring 62 encloses and bears upon an outer surface region 66 of a hollow support piece 68 which is threaded for at least part of its length and is screwed into female pipe element 60. Finally on its surface opposite that bearing on the end of the male pipe element, sealing ring 62 is located against external shoulder 70 on the support piece.

Support piece 68 will preferably be given a venturi shape on its inner surface to minimize pressure losses of fluids flowing through it between pipe joint elements 58 and 60, and it may be designed with a plurality of receptacles such as notch 72 to provide purchase for means to screw it into pipe element 60. Outer surface 66 of the support piece will preferably have a diameter at least slightly less than the bore of the male pipe element. The joint of FIG. 5 like that of FIG. 4 requires at least one more element, namely a support piece, than do the joints of FIGS. 1, 2, and 3. Also like that of FIG. 4, however, the joint of FIG. 5 has the advantage over those of FIGS. 1, 2, and 3 that no specially provided shoulder is needed on either the male or female pipe joint element to seat the sealing material. With a sealing ring 62 and support piece 68 of proper size available, therefore, the joint of FIG. 5 can be made of standard pipe parts.

In assembling the joint of FIG. 5, the sealing ring 62 is first secured substantially fixedly on support piece 68. Such securing may be effected by any suitable means including a cement on circumferential surface 66 and shoulder 70 or knurling on surface 66 with the sealing ring being a press fit thereover. Sealing ring 62 will desirably be threaded externally in continuation of the threads on the support piece. With sealing ring 62 and support piece properly joined, this sub-assembly is screwed into the female pipe element 60 until its threads seize in those of the latter element with the female threads exerting at least some compression on the sealing ring.

Assembly of the joint of FIG. 5 is completed by screwing pipe elements 58 and 60 together. The threads of these elements must not seize until end surface 64 of the male element exerts sufficient compression on ring 62 to be sealed against it, and at the same time increases pressure between the sealing ring and the female threads to insure the seal between ring 62 and pipe element 60. Most desirably, the threads of pipe elements 58 and 60 will go tight just as the sealing ring begins to be deformed or flowed at least into the mating line between the threads of male element 58 and female element 60.

Assuming that outer surface 66 of support piece 68 does extend within the bore of male pipe element 58 as shown, it will neither be counted upon nor desired to be a particularly close fit on the inner surface of the male element. Accordingly, pressure of fluid material contained in or conveyed through the pipe elements will be exerted directly against a surface of sealing ring 62. This will of course be true also if support piece surface 66 does not extend into male element 58; that is, if this surface is not as long as sealing ring 62 is thick. The material of the sealing ring will be subject to further fluid pressure if there be a leakage path between the threads on female element 60 and those on support piece 68. So long as the seal between ring 62 and male pipe end surface 64 be sound, however, the only significant effect of any fluid pressure exerted on the sealing material will be that of further flowing this material into the mating threads of the male and female pipe elements and so improving the fluid tightness of the joint.

Referring next to FIG. 6, the male element of the pipe joint is designated 74 and the female element 76, and it will be noted that these elements are cut with tapered threads. A specially configured ring of sealing material 78 is seated on the penetrating end surface 80 of male element 74, and on a part of its own outer circumferential surface this ring is in contact with the threaded region of female element 76. On its inner circumferential surface this ring encloses, bears upon, and is stiffened by a support piece 82 which is of a more rigid material than the sealing ring itself. This support piece is not of fundamental importance to the illustrated apparatus embodiment of this invention, but will often be desirable. As one example of its application, support piece 82 may be of steel with ring 78 of Teflon. As another example, support piece 82 may be a carburized layer of steel while ring 78, actually integral with the support piece, is steel of a relatively soft and deformable nature.

A considerable part of the outer surface of the sealing ring will be cut back to a smaller diameter than the region in contact with the female pipe threads to allow a high degree of compression on the latter region. Support piece 82 will preferably be given a venturi shape on its inner surface to minimize pressure losses of fluids flowing through it between pipe joint elements 74 and 76, and it may be designed with a plurality of receptacles such as 84 which may extend through ring 78 to provide purchase for means to screw the ring and support piece into pipe element 76. Where ring 78 and support piece 82 are in fact separate pieces, the sealing ring may be molded or machined to its desired shape as shown; the support piece fitted into it as a substantially straight cylindrical piece, and then the support piece spun, upset, or otherwise worked according to any appropriate process well known to the materials-shaping art to conform with the interior surface of the ring. Contrariwise, the support piece may be formed first and then the sealing ring molded or otherwise fitted around it.

Assuming that a reasonably stiff sealing ring 78 is used without a support piece or that the ring and support piece are available as a ready-made assembly, the joint of FIG. 6 requires only the same number of elements as do the joints of FIGS. 1, 2, and 3, and one less than do the joints of FIGS. 4 and 5. Like the joints of FIGS. 4 and 5, however, the joint of FIG. 6 has the advantage over those of FIGS. 1, 2, and 3 that no specially provided shoulder is needed on either the male or female pipe joint element to seat the sealing material. With a sealing ring 78 of proper size available with or without a support piece 82, therefore, the joint of FIG. 6 can be made of standard pipe parts.

In assembling the joint of FIG. 6, the sealing ring 78 which is initially threaded in the region shown, and which may or may not have a support piece 82, is screwed into the female pipe element 76 until its threads seize in those of the latter element with the female threads exerting at least some compression on the sealing ring. Assembly of the joint of FIG. 6 is completed by screwing pipe elements 74 and 76 together. The threads of these elements must not seize until end surface 80 of the male element exerts sufficient force on the shoulder surface of sealing ring 78 to make a seal against it, and at the same time increases pressure between the sealing ring and the female threads to insure the seal between ring 78 and pipe element 76. Compression of pipe end surface 80 against the sealing ring will tend to flow the sealing material into the thread interface between pipe joint elements 74 and 76. Fluid pressure exerted on the sealing material will have this same effect.

This concludes the detailed discussion of the drawing. It may be seen that in each illustrated embodiment of this invention at least a two-way seal has been formed, one way against the interior surface of the female pipe joint element and the other way against the end of the male element. Such dual sealing is in precise accordance with the basic principal of this invention stated earlier. It should be noted that in each embodiment a condition of at least incipient plastic flow of sealing material into the thread interface of the male and female pipe joint elements has been achieved. Although this invention has been described with a certain degree of particularity, it is to be understood that the present disclosure has been made only by way of example, and that numerous changes in the details of construction and configuration of parts may be resorted to without departing from the spirit and scope of this invention as hereinafter claimed.

We claim as our invention:

A sealed pipe joint, said joint comprising (1) a first pipe member having an interior surface of which at least a portion is threaded on a taper, (2) a second pipe member having an end region and further having an exterior surface of which at least a portion adjacent said end region is threaded on a taper, said second pipe member being in threaded engagement with said first pipe member, (3) a ring element of deformable material relatively soft with respect to the materials of said first and second pipe members and having inner and outer circumferential surfaces, said ring element being held in compression on at least a part of its outer circumferential surface against at least a part of the threaded portion of said interior surface of said first pipe member, and further being held in compression against said end region of said second pipe member and extending into the bore of said second pipe member, and (4) a hollow support piece having inner and outer circumferential surfaces and being disposed within said ring element with the inner circumferential surface of said ring element and the outer circumferential surface of said support piece in essentially full area contact from surface to surface, said support piece being relatively stiff diametrally with respect to said ring element.

References Cited in the file of this patent

UNITED STATES PATENTS

| | | |
|---|---|---|
| 262,581 | Doolittle | Aug. 15, 1882 |
| 278,800 | Kline | June 5, 1883 |
| 354,560 | Levier | Dec. 21, 1886 |
| 1,889,870 | Montgomery | Dec. 6, 1932 |
| 1,938,255 | Hinderliter | Dec. 5, 1933 |
| 2,110,127 | Hinderliter | Mar. 8, 1938 |
| 2,179,202 | Simpson | Nov. 7, 1939 |
| 2,694,022 | Schreiner | Nov. 9, 1954 |

FOREIGN PATENTS

| | | |
|---|---|---|
| 24,405 | Great Britain | Oct. 23, 1909 |
| 380,450 | Great Britain | Sept. 13, 1932 |